Figure 3:
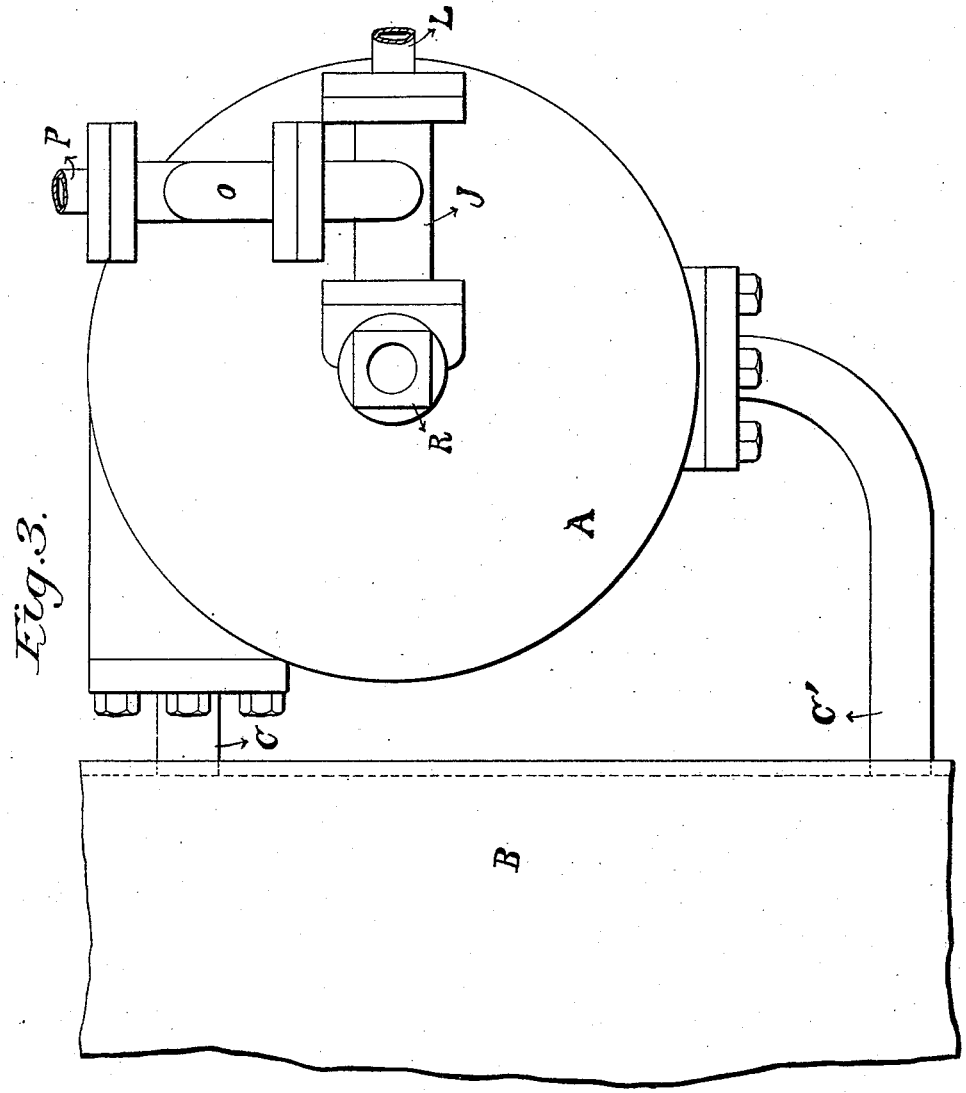

(No Model.) 2 Sheets—Sheet 1.
M. POSCHINGER.
LIQUID REGULATOR.
No. 485,563. Patented Nov. 1, 1892.
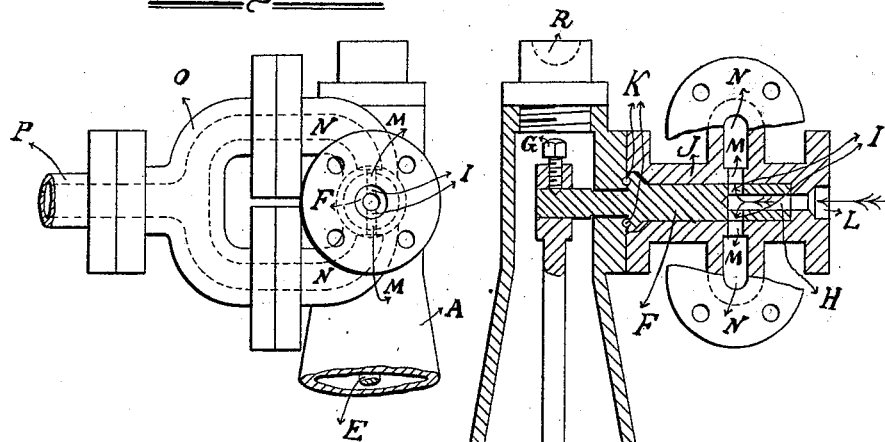
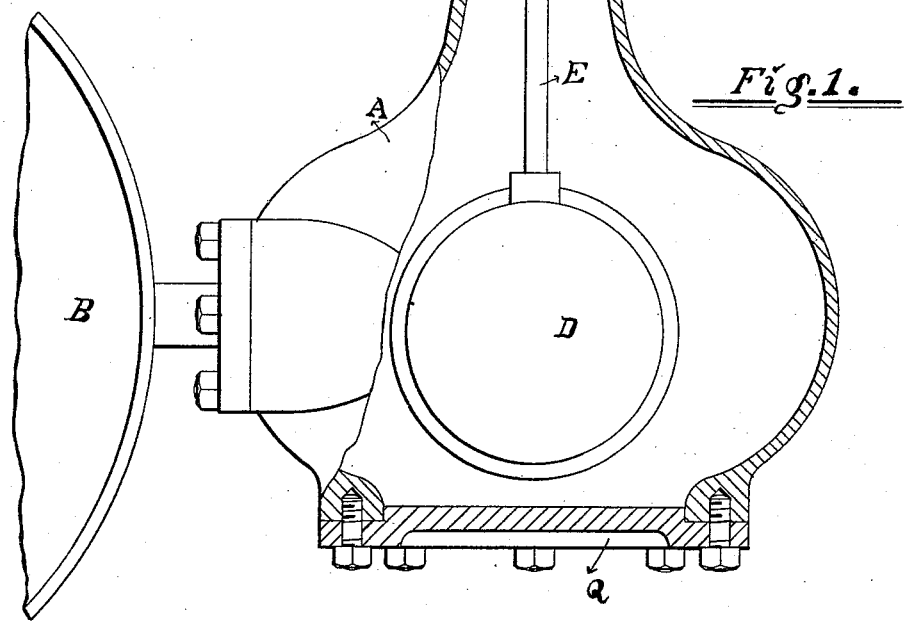
WITNESSES:
INVENTOR (No Model.) 2 Sheets—Sheet 2.
M. POSCHINGER.
LIQUID REGULATOR.

No. 485,563. Patented Nov. 1, 1892.

WITNESSES: INVENTOR

UNITED STATES PATENT OFFICE.

MATHIAS POSCHINGER, OF LOUISVILLE, KENTUCKY, ASSIGNOR TO THE SULZER-VOGT MACHINE COMPANY, OF SAME PLACE.

LIQUID-REGULATOR.

SPECIFICATION forming part of Letters Patent No. 485,563, dated November 1, 1892.

Application filed July 18, 1892. Serial No. 440,422. (No model.)

*To all whom it may concern:*

Be it known that I, MATHIAS POSCHINGER, a citizen of the United States, residing at Louisville, in the county of Jefferson and State of Kentucky, have invented certain new and useful Improvements in Automatic Liquid-Regulators; and I do hereby declare the following to be a full, clear, and exact description of the invention, such as will enable others skilled in the art to which it appertains to make and use the same.

My invention relates to the devices for regulating automatically the height of liquids in vessels and depends for its action upon a float rising and falling with the surface of the liquid, thus decreasing or enlarging the outlet of a valve in the pipes supplying the liquid to the vessel.

In the accompanying drawings, Figure 1, Sheet 1, is a horizontal sectional view through the center of the regulator and a portion of the vessel to which it is attached. Fig. 2, Sheet 1, is a vertical sectional view through the valve-outlet and showing a portion of the regulator-chamber. Fig. 3, Sheet 2, is a vertical plan view of the regulator and a portion of the vessel to which it is attached.

A is the chamber, which is supported and connected to the vessel B, in which the height of the liquid is to be regulated, by the pipes C C', through which the liquid communicates with the chamber A.

D is the ball which floats upon the surface of the liquid, and E is its stem, which is attached to the valve F by means of the screw G. The valve F has an opening H in one end, connecting with the valve-outlets I.

J is the valve-seat, provided with the friction-balls K to cause the valve F to move with ease.

L is an opening in the valve-seat, to which is attached an inlet-pipe supplying the liquid flowing into the valve.

M are openings in the valve-seat, which are exactly opposite the outlets I when the valve is fully opened.

N are passages which conduct the liquid to the connection O, from which it passes through the pipe P into the vessel B.

Q is a head covering an opening through which the ball D is passed into the chamber A.

R is a cap which closes an opening through which the screw G is manipulated.

In use the liquid flows under pressure through the openings L and H, and thence through the outlets I, the openings M, the passages N, the connection O, and the pipe P to the vessel B. The liquid maintains the same level in the chamber A as in the vessel B by passing through the pipes C C'. It is not intended to allow the liquid to fall below the level of the pipe C'. The pipe C may be dispensed with and the pipe C' perform the offices of both pipes. The balls K are used in connection with the valve F to relieve the friction caused by the high pressure of the liquid passing into the opening H and acting upon the bottom thereof. I prefer to use more than one outlet I to distribute and balance the pressure and prevent the unequal wear of the valve and valve-seat, as might occur in the use of a single outlet. This construction also allows the valve to move more easily in its bearings. When the surface of the liquid stands in the vessel B between the pipes C C', it will be at a corresponding level in the chamber A, and as it rises or falls in the vessel B it will equally rise and fall in the chamber A, and as its height varies therein it will by the rise and fall of the floating ball D gradually close or open the valve-outlets I by the rotation of the valve F in its seat J, so as to regulate the flow of the liquid through the valve-outlets and pipes to the vessel B.

Among the advantages of my invention are the sensitiveness of the valve, its being entirely automatic, its having the pressure so balanced as to prevent unequal wear, and its adaptability to regulate the flow of liquid under high pressure into a vessel where there is a much lower pressure.

Another advantage is that the liquid passing through the valve does not communicate directly to the chamber containing the floating ball, so that the latter is not affected by the difference of pressure in the vessels or pipes. It is especially adapted to regulate the flow of ammonia in ice-machines.

Having fully described my improved automatic regulator, what I claim as new and of my invention, and desire to secure by Letters Patent, is—

1. An automatic regulator consisting of a casing A, a rotatable valve F in the upper end thereof, having passages H and I, pipes normally connecting said passages with the vessel, communicating pipes C C', the floating ball D, and stem E, connecting said ball and the inner end of the valve, all substantially as and for the purposes set forth.

2. An automatic regulator consisting of a casing A, communicating pipes C C', a valve-seat in the upper end of the casing, having outlets M, passages N, leading from said outlets to a pipe P, a valve F, journaled in the seat and having the passages H and I and ball-bearing K, a floating ball within the casing, and a stem connecting said ball with the inner end of the valve, all substantially as and for the purposes set forth.

In testimony whereof I affix my signature in presence of two witnesses.

MATHIAS POSCHINGER.

Witnesses:
H. R. PHILLIPS,
JAMES W. BEATTIE.